2,950,225
METHOD OF MAKING INSULATION BLOCKS AND SHAPES

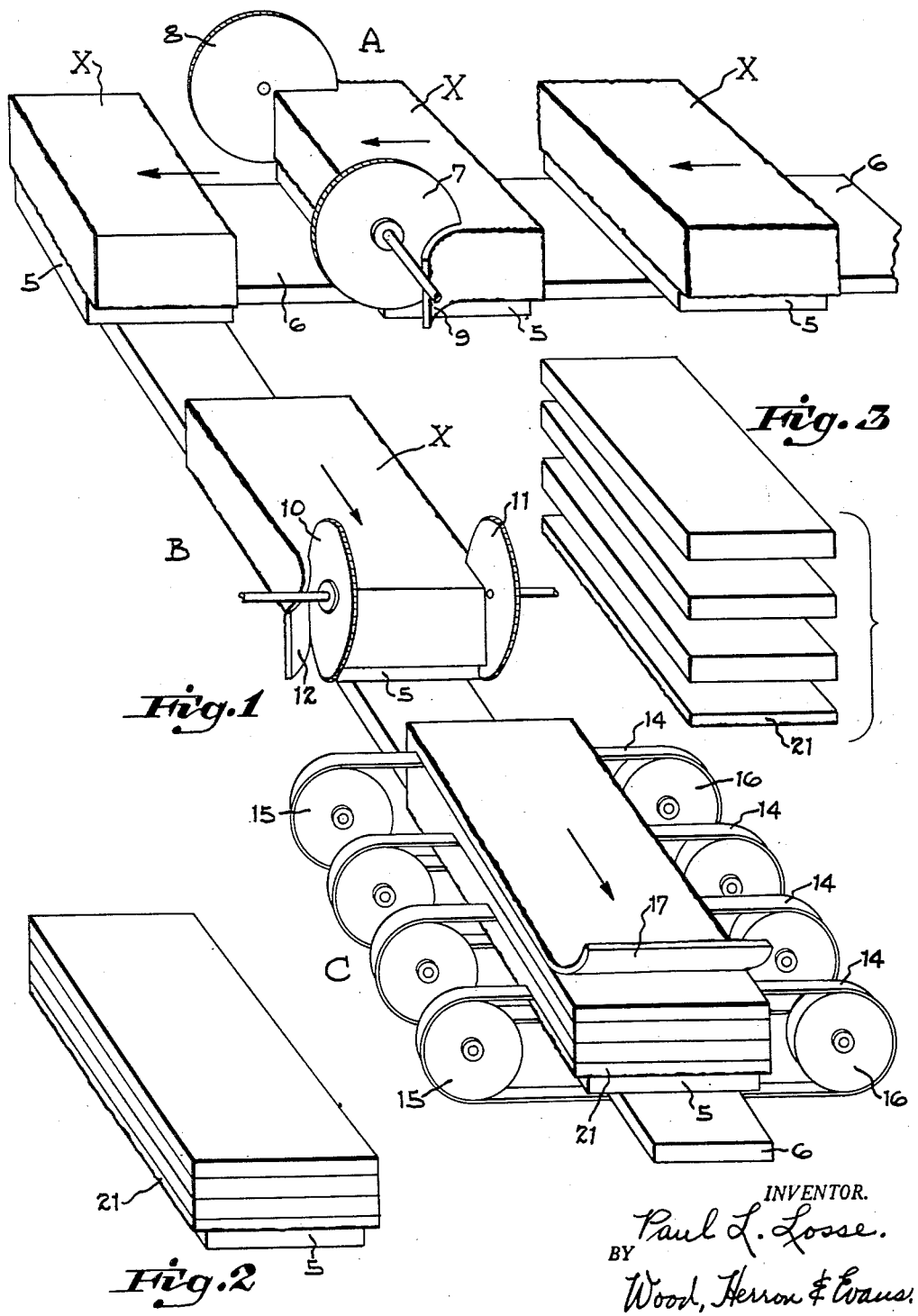

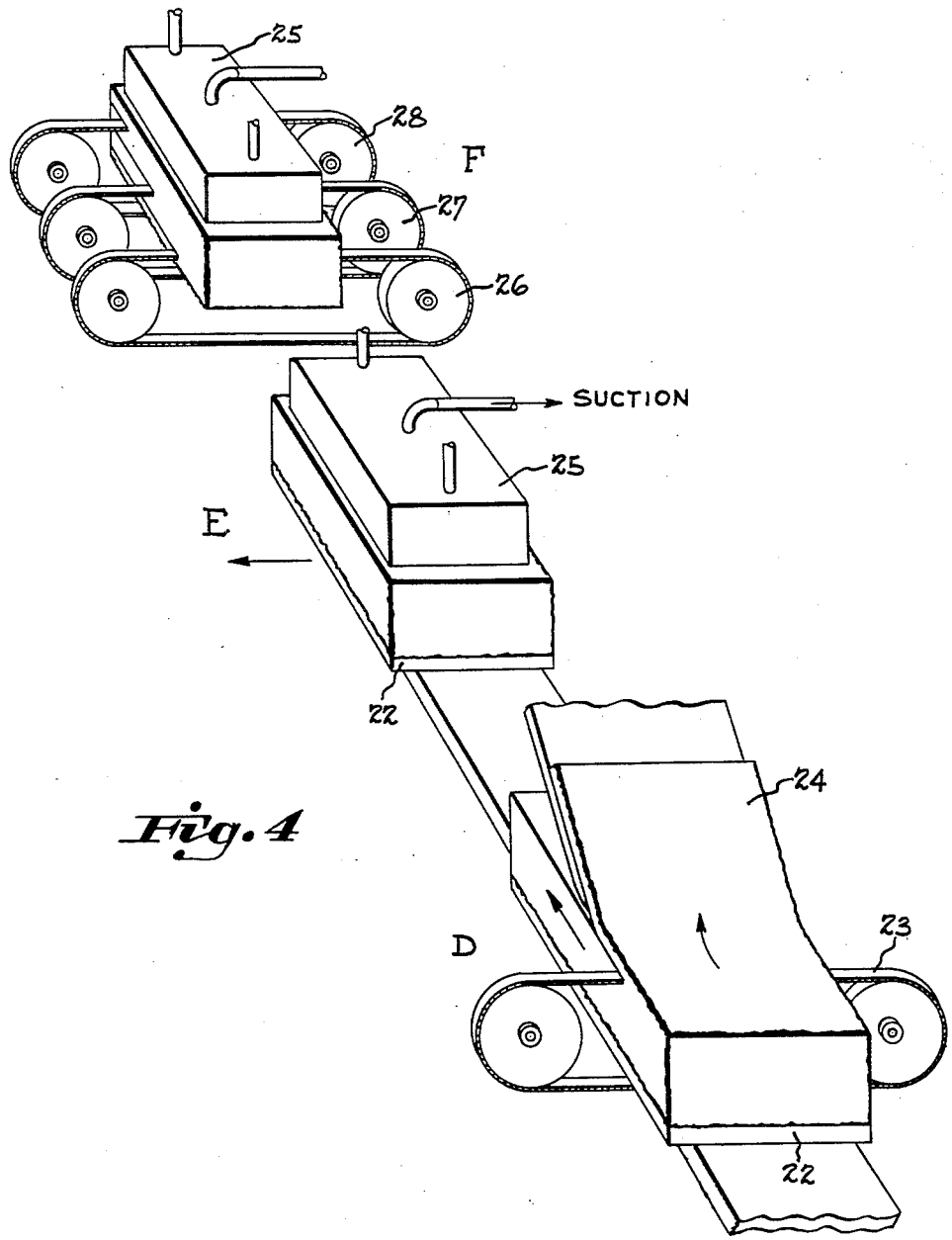

Paul L. Losse, Joplin, Mo., assignor to The Eagle-Picher Company, Cincinnati, Ohio, a corporation of Ohio Filed Jan. 21, 1955, Ser. No. 483,604

2 Claims. (Cl. 162—201)

This invention relates to improvements in the manufacture of thermo-insulation blocks and shapes from a wet mixture of fibrous material, such as mineral wool, and a binder, such as clay. The invention is directed particularly to a method whereby such a composition is sawed, while wet, to its final predetermined shape or configuration, and is then dried, set, and hardened.

Typical insulation products adapted to be fabricated in accordance with the present invention are multi-cellular materials consisting of mineral, slag or rock wool fibers bound and integrated by a hardened and set clay composition. Such products are endowed with thermo-insulating properties by virtue of the multiplicity of air cells which they contain and by virtue of the relatively low heat conductivity of the fibrous lattice of which they are comprised. Blocks, slabs, and various other shapes of such materials are used as heat insulation upon tanks, vessels, pipes and the like, the application usually being accomplished with the aid of a suitable adhesive or mechanical attachment. Such products are of light weight, for example 16 to 24 pounds per cubic foot and are inherently somewhat fragile because of the cellular nature of the relatively brittle mineral fiber which constitutes a substantial portion of the mass.

Heretofore, it has been conventional practice in the industry to prepare such products by making a water slurry of the composition, admixing the bulk mineral wool or other fiber with the slurry, and then casting the mixture into an oversize porous mold, i.e., a mold approximately 30% to 40% greater in volume than the finished product is intended to be. Excess water is drained from the mixture in the mold, sometimes with the aid of mechanical expulsion or suction. In this manner, the water content of the mixture is reduced to approximately 40% to 60%, after which the wet shaped composition is stripped from the mold and then dried within an oven.

The dried material produced in this manner is next brought to final size and shape by means of circular saws. The sawing operation inherently is dirty and dusty, since the dried material is relatively brittle, and since the cuttings are of a fibrous nature. The waste or scrap material produced in bringing the product to its final size and shape is usually discarded, since it cannot conveniently be re-used as a component of the slurry. Because of the dustiness of the saw-cutting procedure, extensive dust collecting equipment is required, but even so, the dust constitutes an irritant to the workmen, for which reason respirators are frequently worn.

This invention is based upon the discovery and determination that a mixture of fibers and binder may be sawed advantageously to its final shape and size while it is still wet, and then may be dried in the usual way to produce a finished product. The invention, therefore, contemplates a manufacturing procedure wherein a hydrous mixture of mineral fiber and binder, having a water content limited merely so that it does not "slump" or collapse and lose a general shape which has been imparted to it by a mold or by continuous production means is sawed to its final shape and size, as by supporting a mass of the composition upon a pallet and passing it between band or circular saws or blades operated singly or in gangs. The wet composition brought to its final size and shape by this procedure is now dried in an oven and is then ready to be used.

By this procedure, a number of advantages are realized. First, the excess wet mixture trimmed away by the sawing in producing the final shape, is directly re-usable in the preparation of additional fiber-binder hydrous slurry. Also, no allowance for kerf is required, and therefore, the mixing equipment need not be of oversize capacity. Similarly, a substantial saving is effected in the cost of oven drying, since none other than the finished product mass, in its final shape and size, is required to be heated in the drying oven. Wet sawing of the product eliminates dust and dirt generation, with attendant elimination of the cost of installing and maintaining the dust collection and ventilating equipment which is common in the conventional manufacturing method.

Besides these readily recognizable advantages, the invention provides distinct improvements in product quality which were not predictable.

First, a distinct improvement in surface quality, texture, and strength is provided. When a saw is passed through a dried block of insulation material of the type described, the parting action is accomplished largely by tearing and breaking the fibers, rather than by actually shearing them. Because of this, the fibers at the line of cutting are subjected to mechanical attrition as they are pulled apart. This action substantially impairs the bonds of fibers adjacent the site of cutting. A dried, sawed block of insulation material, therefore, presents an exposed cut surface which is somewhat more friable than interior portions, but which is also laden with dust and particles that were trapped in the porous lattice during cutting by the saw.

In contrast with these effects, wet cutting is accomplished by a parting of the fibers before they have been bonded rigidly to one another. Therefore, no previously set bond is destroyed. In fact, the wet cutting operation is described more accurately as a blade-parting operation, rather than a true cutting operation, since there are no saw cuttings in the usual sense.

This severing of the wet composition is, in turn, accompanied by a wiping action of the saw blade on the severed surface. For the present purpose, band saws have been found to be particularly suitable; the toothed edge of the band saw leads into the material, while the trailing widthwise portions of the band saw wipe across the surface of the cut and, because of the pliability of the wet mass, produce a distinct smoothing effect. Peculiarly, however, even though the material is wet and soft to the feel, the saw does not cause the composition at one side of the saw line to be displaced or off-set by drag with respect to the material at the other side of the saw line.

An important discovery attending the present invention resides in the fact that the parting line delineated by the passing of a saw blade through a wet mass of the material is preserved throughout drying, even though the sections at the opposite sides of the parting line are left in direct contact with one another, as, for example, one on top of the other. Thus, in typical practice of the invention where slabs are to be produced, a large block of wet composition resting on a pallet is moved past a band saw operated in a horizontal plane. Each saw cut is spaced from the next a distance corresponding to the ultimate thickness of a given slab to be produced, but the wet slabs do not need to be separated from one another individually. The entire mass, then comprising a plurality of parting lines corresponding to the respective saw cuts, is advanced to a drying oven wherein it is dried to its final state. When the entire mass is removed from the oven, the slabs delineated by the generally undiscernable saw cuts separate readily from one another. This discovery enables substantial elimination of the handling of individual pieces as required in conventional procedure.

Although the exact reason which accounts for the separability of dried slabs which have been parted by wet sawing cannot fully be explained from the evidence which is available at present, it is believed that the wiping action of the trailing portion of the saw blade may accomplish the effect, at least in part. In the passage of the saw, those fibers extending across the saw line are broken or moved to one side or other of the parting line. Therefore, fibrous masses at the one side of the parting line are not joined by any fibers bridging to the other side. The troweling action of the blade also provides a degree of smoothness at the meeting surfaces which prevents their adhesion even though they are dried while they are in direct contact.

In addition, each wet cut surface becomes a surface from which some moisture is lost during the drying process. It is probable that during drying, some of the cement or binder material migrates to the wet cut surface and, being unable to migrate fully across the line because of the absence of any bridging fibers at that point, a crust is formed. This crust is distinctly noticeable in the finished product and confers a valuable abrasion-resistant and dust-free property to its surface. In the conventional drying-sawing operation, such crusts, if formed at all, are removed as waste in bringing the block to its final size. Products produced in accordance with the present invention display a breaking strength which is approximately 20% greater than the breaking strength of products of similar base composition but produced by the conventional dry-sawing technique. It is believed that this additional strength is conferred, at least in part, by the crust-forming action just described.

A further discovery of considerable commercial importance resides in the fact that a wet-sawed shape, block, or slab, even though containing appreciable moisture, dries at a more rapid rate than an uncut wet mass of the same configuration and moisture content, and does not shrink or contract in size if a proper formulation is employed in the make-up of the wet composition. In respect to rate of drying, it may be that the texture of a wet-sawed surface affords greater rate of water liberation than the surface texture which is imparted to a mass by a mold.

In general, the drying time is reduced as much as 10% to 20% in comparison with the time required to dry wet molded masses of the same size and shape. A typical example of such composition is given at a later point in this specification, but it will be understood that various other mixtures may be employed, and also that if appreciable shrinkage does occur during drying of a composition of some other formulation, then appropriate allowance for shrinkage may be made in the dimensions to which the mass is wet-sawed.

The parting operation itself may be conducted in any suitable manner, for example, by a toothed band or blade saw, by a circular saw, or combinations thereof, or by a rapidly operated parting blade. Production may be accomplished either by sawing individually molded masses, or by sawing a continually emerging wet mass into units of predetermined size by lengthwise and cross sawing. By the practice of the invention, slabs and shapes of various configurations may be produced which are as little as approximately ¼ of an inch thick; products of such thinness cannot be cut from dried blocks by conventional methods because of their fragility.

Typical practice of the present invention for commercial production is illustrated diagrammatically in the accompanying drawings in which:

Fig. 1 is a perspective illustration of the successive steps or operations through which a wet, self-sustaining mass is parted by wet-sawing, for the production of a number of insulation slabs of predetermined size and shape;

Fig. 2 is a perspective view of a block of wet composition trimmed to size and parted into slabs by the operation shown in Fig. 1 and ready for drying;

Fig. 3 is a view of the sawed mass shown in Fig. 2 separated into its respective slabs after drying; and Fig. 4 is a view similar to Fig. 1 showing another procedure through which the mass is held by suction during wet-sawing.

Those skilled in the art are familiar with the production of a mixture of mineral fiber and binder slurry, and therefore, that procedure is not described in detail herein. In general, in the common procedure, a slurry is first prepared of water and a cementitious material such as clay, with which fibrous material such as mineral wool is incorporated. The wet admixture of wool and binder slurry is then introduced into a mold which functions to impart a shape to the mass as excess water of the slurry is being removed. Various types of compositions and various types of binders have been used, and some, during drying, shrink considerably more than others. A low-shrinkage composition which has been found to be particularly amenable to use in the over-all practice of this invention is prepared as follows:

To 25 gallons of water, 4 pounds of starch is added, such as cornstarch. The starch is peptized by heating the mixture, then additional water is added to bring the total volume to approximately 100 gallons. Next, 25 pounds of clay is added, a sodium-type bentonitic western swelling clay being preferred. Caustic soda is also added to deflocculate the clay, the amount of caustic soda (as 58.9 $Na_2O$, or equivalent) being approximately ¾–2% by weight of the added clay. The mixture is now stirred until the caustic soda is completely dissolved, and then the clay in the slurry is flocculated by addition of alum, such as commercial aluminum sulfate, in the proportion of approximately 10–15% by weight of the added clay. The slurry at this stage is of a relatively thick or gelatinous consistency, and additional water is added to bring the volume up to approximately 500 gallons. Approximately 200–250 pounds of mineral wool or equivalent fiber is added to the 500 gallons of slurry and co-mingled therewith by gentle stirring so as to distribute the slurry over the fibers. The amount of clay in the slurry and the amount of wool added to the slurry may be varied from the quantities given, depending upon the density and strength which are desired in the final product.

The mixture of wool and slurry is now introduced into perforated molds and, preferably with the aid of suction, excess water is drained from the mixture until the water content of the mass is approximately 2–2½ times the weight of the solids therein. Such a mixture is self-sustaining and sufficiently cohesive to retain its shape when sawed while wet, though it will be understood that this example merely illustrates one suitable procedure and that the moisture content may actually be more or less than that indicated, depending upon the binder and the fiber which are employed, as well as other factors.

A wet mass of oversize shape as typically produced in an operation of the type just described, is not sufficiently strong to be lifted up without indentation or breakage, and therefore, it is best sawed while supported over an entire face, as by means of a wooden pallet or the like. Thus, as shown in Fig. 1, the oversize mass to be wet-sawed is placed upon a pallet 5 which, in turn, is slideable upon a longitudinal table 6 or suitable guide rails. The pallet is caused to move along the table (by pusher or drive means not shown) past successive sawing stations at which the block is cut to final size.

The first and second sawing stations, A and B respectively, are arranged to trim the mass to length and width. This procedure may be conducted with conventional circular-saw gang-sawing equipment, or in other suitable manner, except that in accordance with this invention, the mass is sawed while wet. Thus, for trimming the ends, the circular saws 7 and 8 are spaced apart a distance corresponding exactly or proportionately to the intended length of the finished product, and the mass of material designated X is moved between the saws. In this operation, the excess of material at the ends is trimmed away, as at 9. This material is collected by conveyor or other means, not shown, and is directly returned for re-use in the preparation of additional slurry-fiber composition.

Beyond the end-trimming station A, the mass X is advanced endwisely, at a right angle to its previous path, through the side-trimming saws 10 and 11 wherein the block is trimmed to width. At this station, the portions trimmed away at the opposite sides, as at 12, is similarly collected and returned to the mixing room for re-use. After passing station B, therefore, the block presents smooth, properly dimensioned ends and sides. If desirable, side trimming may precede end trimming, rather than follow it as shown.

The next sawing station, C, comprises one or a plurality of band saws 14 respectively supported upon wheels 15 and 16, which are arranged in pairs. At least one wheel of each pair is driven by suitable power means; the drives for the band saw wheels, the usual blade tensioning devices, and the like, are conventional, and therefore, are not shown.

In the operation shown in Fig. 1, it is assumed for purposes of illustration that a number of slabs are to be produced from the mass now trimmed to length and width; therefore, the band saws 14 are spaced transversely with respect to one another distances corresponding to the thickness of the intended slabs. The cutting run of the topmost saw is positioned to trim away the rough upper surface which may be peeled away, as at 17, while the cutting run of the lowermost blade is positioned above the top surface of the pallet 5 a distance sufficient to accommodate any undulation or local irregularity in the lowermost surface of the mass. The upper trim 17 is returned for re-use, but the portion of material which remains between the lowermost saw 14 and the pallet is, according to this method of production, allowed to remain in place upon the pallet.

In this sawing operation, it will be seen that the trimmed block is parted into a plurality of slabs, each one, after sawing, resting directly upon the one beneath it. To avoid a drag effect through which all of the saws might frictionally tend to displace the mass sidewisely upon the pallet, the saws may be operated in alternate directions. Should the block be intended to be trimmed into a single shape, then only the top and bottom surfaces will be trimmed, and the other band saws in the gang will, of course, be omitted. For production purposes, gang band saws have been found to be very suitable for the slab sawing operation, but it will be also understood that only a single saw may be used, either the saw or the block being re-positioned after each cut to a position ready for the next cut to be taken. Band saws may be used in place of the circular saws shown at the side and end-trimming stations, the various types of saw blades shown in the drawings being illustrated to indicate their interchangeability.

As indicated, each of the operations A, B, and C impart predetermined dimension to the main body of the mass, while the material beyond the parting lines constitutes the trim. In dry-sawing operations, these trim portions normally are discarded as waste. However, in the practice of this invention, the trim material is wet and is directly re-usable in the preparation of successive batches of slurry from which other masses to be sawed are produced by molding. Although the trim material has less water content than the original mixture which was introduced into the molds, by reason of the drainage which took place there, an adjustment may readily be made in the total amount of water used to compensate for the difference.

In the method of production which is shown in Fig. 1, it is not generally practicable, except by the use of special equipment, to remove that portion of the trim indicated at 21 which resides between the pallet 5 and the lowermost saw cut, and therefore, that amount of material may be allowed to remain beneath the stack of slabs in accordance with this mode of procedure.

The stack of slabs, as produced at the station C, is ready for drying, for which purpose the pallet and the material on it are advanced into an oven operated at a suitable temperature, for example 250° to 400° F., and allowed to remain therein until the cement is hardened, and the mass is dried.

Upon being removed from the oven, the slabs delineated by the respective lengthwise cuts readily may be parted from one another. This is shown in Fig. 3. The bottom trim 21, now also dried, may be discarded.

The mode of operation shown in Fig. 4 contemplates the employment of a suction head for holding a block from above, while one or more cuts are taken through it longitudinally while it is wet. For this type of operation, it is usually desirable initially to prepare the top surface of the mass so that it is smooth and well-adapted to be held by a suction head. For this purpose, a molded mass is rested initially upon a pallet 22 on which the block is moved past a band saw 23 which is positioned to scalp the trim portion 24 from the block, and thereby produce an upper surface ready to receive a suction head. The block on the pallet is next advanced to station E wherein the top surface is engaged by a suction head or box 25 supported in any suitable manner. The suction head 25 is now lifted, and the pallet 22 is removed from beneath the block. The suction head carrying the block may now be moved or guided in any suitable manner past one or more saws 26, 27, and 28, etc., which produce the desired longitudinal cuts. Movement of the mass relative to the saw blade may also be controlled by hand or by mechanical means to provide or generate non-linear, i.e. circular or curved, cut surfaces as desired. As an alternative, a single band saw may be used first to scalp the bottom surface, then either the band saw or the block may be operated to part individual slabs from the block, ready to be dried individually. In this type of operation, the trim from the bottom and top surfaces is removed for re-use from the mass prior to drying.

Satisfactory results have been obtained at saw speeds of approximately 2,800 feet per minute, for band saws .020 inch in thickness and ⅜ of an inch wide, with five teeth to the inch. Circular and reciprocating saws may be operated at similar lineal cutting speeds. In general, the lineal speed is somewhat related to the number of teeth per inch of the saw, increase in the number of teeth per inch permitting slower saw speeds to be used, and vice versa. The reduction in speed is useful when saw kerfs of greater length are to be cut. The lower lineal saw speeds reduce the likelihood of saw blade vibration and smooth cuts thereby are facilitated.

The power requirement for sawing is very low on account of the lubrication provided by the water content of the material. The wet material itself parts easily under the action of the saw blades and blocks 30 inches or more in kerf length readily may be cut. The sequence in which the respective saws are employed in cutting the mass is of no consequence.

In the foregoing description of the present invention, water is disclosed as the liquid vehicle through which the binder components are distributed over the fibers. This type of formulation is inexpensive and suitable for use with clay-type binders, starches, asphalt emulsions, and the like, the water readily being expelled from the porous mass after shaping, by heat at relatively low temperature. However, it is to be understood that the same principle of fabrication is applicable to compositions wherein organic binders are employed with the use of evaporable liquid vehicles other than water, such as volatile solvents, and also in the employment of emulsion-type resinous binders wherein the binder constitutes the disperse phase of an emulsion which is sufficiently liquid to be distributed over the fibers.

Having described my invention, I claim:

1. The method of producing insulation slabs comprising steps of mixing a loose fibrous material in a slurry containing heat hardenable binder and an evaporable fluid, the ratio of fibrous material to binder being approximately 10:1, forming the admixture into a mass which is wet with fluid but does not slump, supporting said mass for movement along a substantially horizontal plane, moving said mass in said horizontal plane, sawing said slurry and fibers along a plurality of horizontal planes with a series of band saws to form a plurality of slabs stacked on top of each other, and to trowel the cut surfaces thereof, said band saws having a width, number of teeth per inch and being driven at a lineal speed to produce the cutting and trowelling characteristics of band saws of $3/8$ inch width with 5 teeth per inch and driven at a lineal speed of 2800 feet per minute, and subjecting the cut wet mass to heat sufficient to drive off the water and harden the composition.

2. The method of producing insulation slabs comprising steps of mixing a loose fibrous material in a slurry containing heat hardenable binder and an evaporable fluid, the ratio of fibrous material to binder being approximately 10:1, forming the admixture into a mass which is wet with fluid but does not slump, supporting said mass for movement along a substantially horizontal plane, sawing said slurry and fibers along a plurality of horizontal planes with a series of band saws to form a plurality of slabs stacked on top of each other, and to trowel the cut surfaces thereof, said band saws having a width, number of teeth per inch and being driven at a lineal speed to produce the cutting and trowelling characteristics of band saws of $3/8$ inch width with 5 teeth per inch and driven at a lineal speed of 2800 feet per minute, and maintaining the desired shapes in contact with each other while subjecting the cut wet mass to heat sufficient to drive off the water and harden the composition.

References Cited in the file of this patent

UNITED STATES PATENTS

| | | |
|---|---|---|
| 582,060 | Hitchins | May 4, 1897 |
| 621,923 | Kerrinnes | Mar. 28, 1899 |
| 1,405,671 | Crozier | Feb. 7, 1922 |
| 1,802,494 | Avery | Apr. 28, 1931 |
| 1,865,049 | Shaver | June 28, 1932 |
| 1,920,982 | Hedrich | Aug. 8, 1933 |
| 1,983,590 | Anderson | Dec. 13, 1934 |
| 2,092,966 | Gay et al. | Sept. 14, 1937 |
| 2,230,880 | Brown | Feb. 4, 1941 |
| 2,276,869 | Pond | Mar. 17, 1942 |
| 2,289,250 | Denning | July 7, 1942 |
| 2,338,813 | Hueter | Jan. 11, 1944 |
| 2,652,931 | Hughes | Sept. 22, 1953 |
| 2,694,846 | Ohlsson et al. | Nov. 23, 1954 |
| 2,747,470 | Jones | May 29, 1956 |